United States Patent [19]
Buchheit et al.

[11] Patent Number: 5,299,106
[45] Date of Patent: Mar. 29, 1994

[54] MOUNTING SHAFT FOR A VISOR HAVING A LIGHTING FIXTURE

[75] Inventors: Christian Buchheit, Ham Sous Vasberg; Jean-Luc Avez, Leuville Sur Orge, both of France

[73] Assignee: Gebr. Happich GmbH, Fed. Rep. of Germany

[21] Appl. No.: 968,433

[22] Filed: Oct. 29, 1992

[30] Foreign Application Priority Data

Oct. 30, 1991 [DE] Fed. Rep. of Germany ....... 4135719

[51] Int. Cl.⁵ ............................................. F21V 33/00
[52] U.S. Cl. ..................................... 362/144; 362/74; 296/97.13
[58] Field of Search ............... 362/144, 74, 80.1, 83.1, 362/83.3, 141, 142, 143; 296/97.1, 97.5, 97.12, 97.13; 248/56

[56] References Cited

U.S. PATENT DOCUMENTS

| | | | |
|---|---|---|---|
| 4,363,511 | 12/1982 | Viertel et al. | 296/97.5 |
| 4,600,234 | 7/1986 | Jönsas | 296/97.1 |
| 4,879,637 | 11/1989 | Clark et al. | 362/141 |
| 4,953,064 | 8/1990 | Viertel et al. | 362/144 |
| 4,998,767 | 3/1991 | Lawassani et al. | 296/97.1 |
| 5,067,764 | 11/1991 | Lanser et al. | 296/97.5 |
| 5,107,569 | 4/1992 | Hughes | 296/97.13 |
| 5,143,678 | 9/1992 | Prillard | 362/144 |

FOREIGN PATENT DOCUMENTS

| | | |
|---|---|---|
| 2737215 | 8/1977 | Fed. Rep. of Germany. |
| 3916560 | 11/1990 | Fed. Rep. of Germany. |
| 3932808 | 4/1991 | Fed. Rep. of Germany. |

*Primary Examiner*—Richard R. Cole
*Assistant Examiner*—Alan B. Cariaso
*Attorney, Agent, or Firm*—Ostrolenk Faber Gerb & Soffen

[57] ABSTRACT

A mounting shaft for a car visor having a lighting fixture. The mounting shaft includes an inner L-shaped preform and an outer L-shaped supplementary body surrounding it. The preform and the supplementary body are plastic injection-molded parts. Two electric connecting wires and two contact pins are incorporated in the preform. The preform includes an end part to which the contact pins are attached by direct extrusion coating to be connectable to the lighting fixture. Two half shells are integrally formed on the end part and connected to it by two hinge connection. Each half shell includes an open cavity for receiving an electric wire and can be swung together to be fastened with the inclusion of the electric connecting wires.

11 Claims, 3 Drawing Sheets

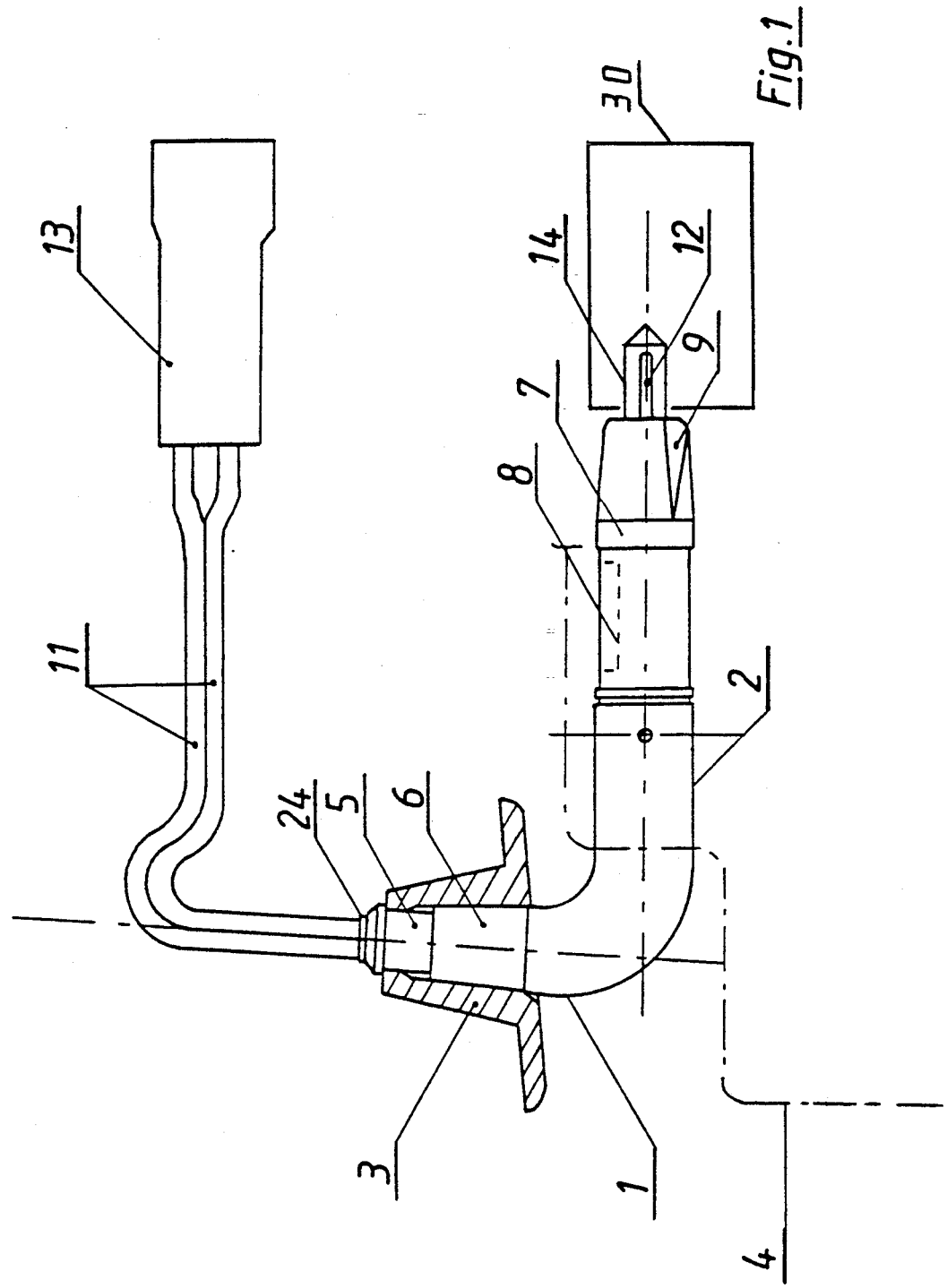

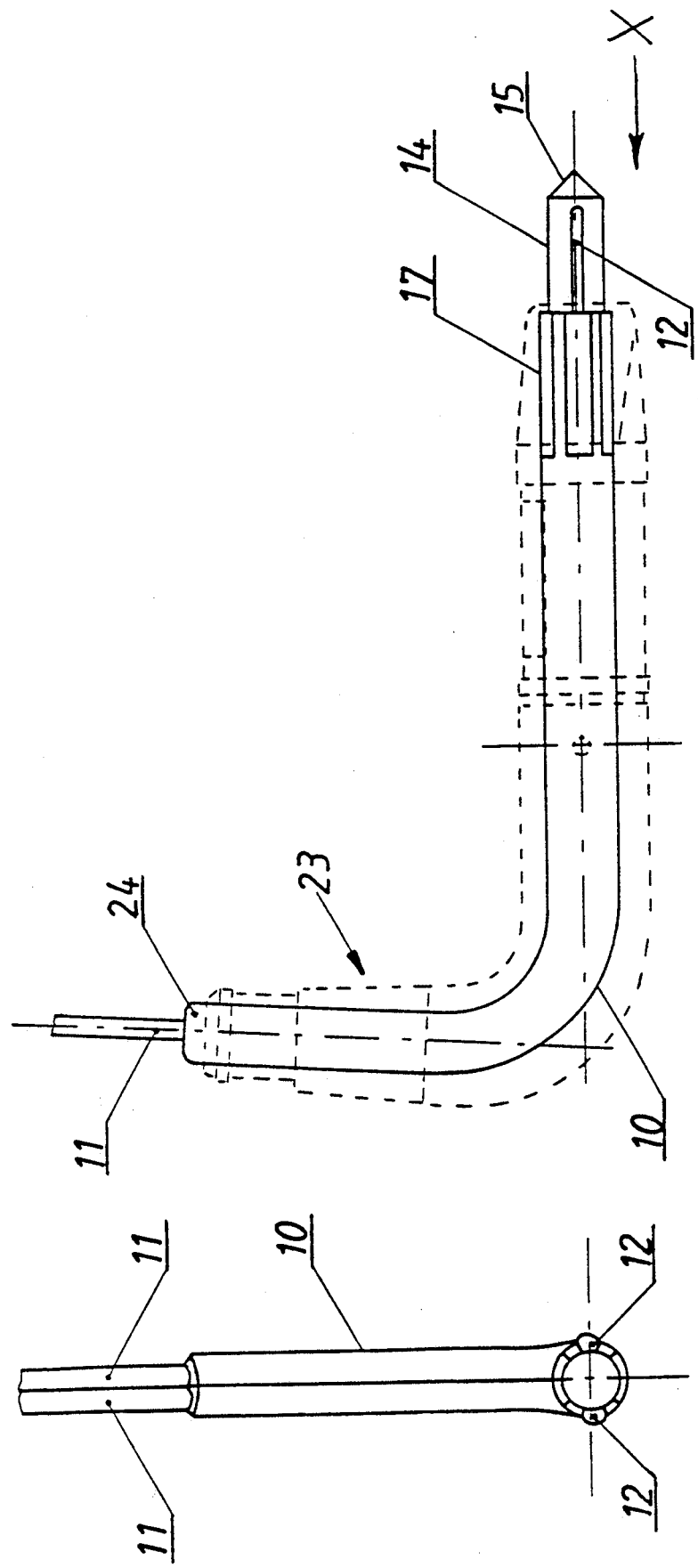

MOUNTING SHAFT FOR A VISOR HAVING A LIGHTING FIXTURE

BACKGROUND OF THE INVENTION

The present invention relates to a mounting shaft for use in mounting a visor in a vehicle. In particular, the present invention relates to a shaft for mounting a vehicle sun visor having a lighting fixture.

Federal Republic of Germany Application OS 39 16 560 discloses a mounting shaft of this type having a two part construction consisting of an inner insert and an outer supplementary body. Two insulated electric wires extend between the insert and the supplementary body. The insert has two longitudinal grooves which are open toward the outer surface of the insert and extend over its entire length. A contact pin and an electric wire connected with the pin are contained in each longitudinal groove. The manufacture of this known mounting shaft has certain disadvantages. It is possible that the electric wires will be forced out of the longitudinal grooves by the extrusion pressure upon molding the supplementary body around the insert, and that the wires will therefore be pressed against the wall of the mold cavity. In such a case the electric wires could be visible on the outside of the mounting shaft, which, of course, is undesirable.

In another mounting shaft, shown in Federal Republic of Germany Application OS 39 32 808, the shaft is developed as a plastic extrusion with a circuit board having electrically conductive paths incorporated in it. This is done by extrusion coating the free ends of the board extending out of the end of the mounting shaft. This approach requires the manufacture of a circuit board which is presently too expensive.

SUMMARY OF THE INVENTION

The object of the present invention is to provide a mounting shaft, for a visor having a lighting fixture, in which the electric wires are dependably received and held in place so that they cannot interfere with the molding of the supplementary body. In addition, a relatively simple and inexpensive construction is desired for the mounting shaft.

A mounting shaft of the invention includes electrical connecting wires for supplying current to a lighting fixture in a vehicle sun visor and contact pins for electrical connection between the wires and the lighting fixture. An inner preform has an end part which supports the contact pins which are to be connected with the lighting fixture. Half shell shaped covers are integrally formed with the end part, and there are hinge connection means between each of the half shells and the end part. Each half shell includes an open cavity for receiving one of the electric wires. Each half shell is swingable to join with the other half shell so as to enclose the wires between them.

The shaft may be L-shaped, with one short arm that is rotatably mounted in a mounting bracket attached to the body of a vehicle, and with the other long arm forming a hinge axis for the visor body, by the long arm being rotatably mounted in a housing provided in the visor body. The inner preform may be formed as an injection molded plastic part. It is covered by an outer supplementary body, which is also formed by injection molding and which surrounds the inner preform. The end part of the inner preform may be at the free end of the long shaft arm.

The contact pins can advantageously be arranged diametrically opposite to each other on the surface of the end part along a longitudinal axis, and may be attached to the end part by direct extrusion coating so as to be supported over a substantial portion of their length. The free ends of the contact pins protrude from the surface of an end region so as to be connectable with the lighting fixture.

The half shells may advantageously be formed on diametrically opposite sides of the end part and be aligned perpendicular to the longitudinal axis of the end part. The hinge connecting means may be flexible connecting webs. The half shells may each include clip pins and clip receivers for fastening the half shells together.

A mounting shaft of the invention has the advantage of dependable fastening of the electric wires to the preform, which can therefore be easily extrusion coated. The fastening of the contact pins on the preform by extrusion coating is particularly important. The electric wires are already integrated with the preform upon production of the preform, so that installation is limited to insertion of the electric wires into the open cavity of the preform half shells. This insertion is easy since the electric wires are already held at one end on the extrusion coated contact pins. The division of the preform into two half shells does not pose any difficulty from a manufacturing standpoint and the folding together of the half shells with the inclusion of the electric wires can also be done rapidly and easily.

Particularly simple and inexpensive manufacture of the preform is enabled, since it is possible to use an injection mold which requires no pusher, or the like, for shaping and removal of the preform from the mold.

The flexible connecting webs are provided in order to permit easy, problem free swinging together of the two half shells, while the clip pins and clip receivers assure dependable holding together of the two half shells so that the supplementary body can be readily extruded around the preform.

Other features and advantages of the present invention will become apparent from the following description of the invention which refers to the accompanying drawings.

BRIEF DESCRIPTION OF THE DRAWINGS

FIG. 1 is a side view of the complete mounting shaft;
FIG. 2 is a similar view of a preform integrated in the mounting shaft of FIG. 1;
FIG. 3 shows the preform of FIG. 2, seen in the direction 2a.

DETAILED DESCRIPTION OF THE INVENTION

Figure 4:
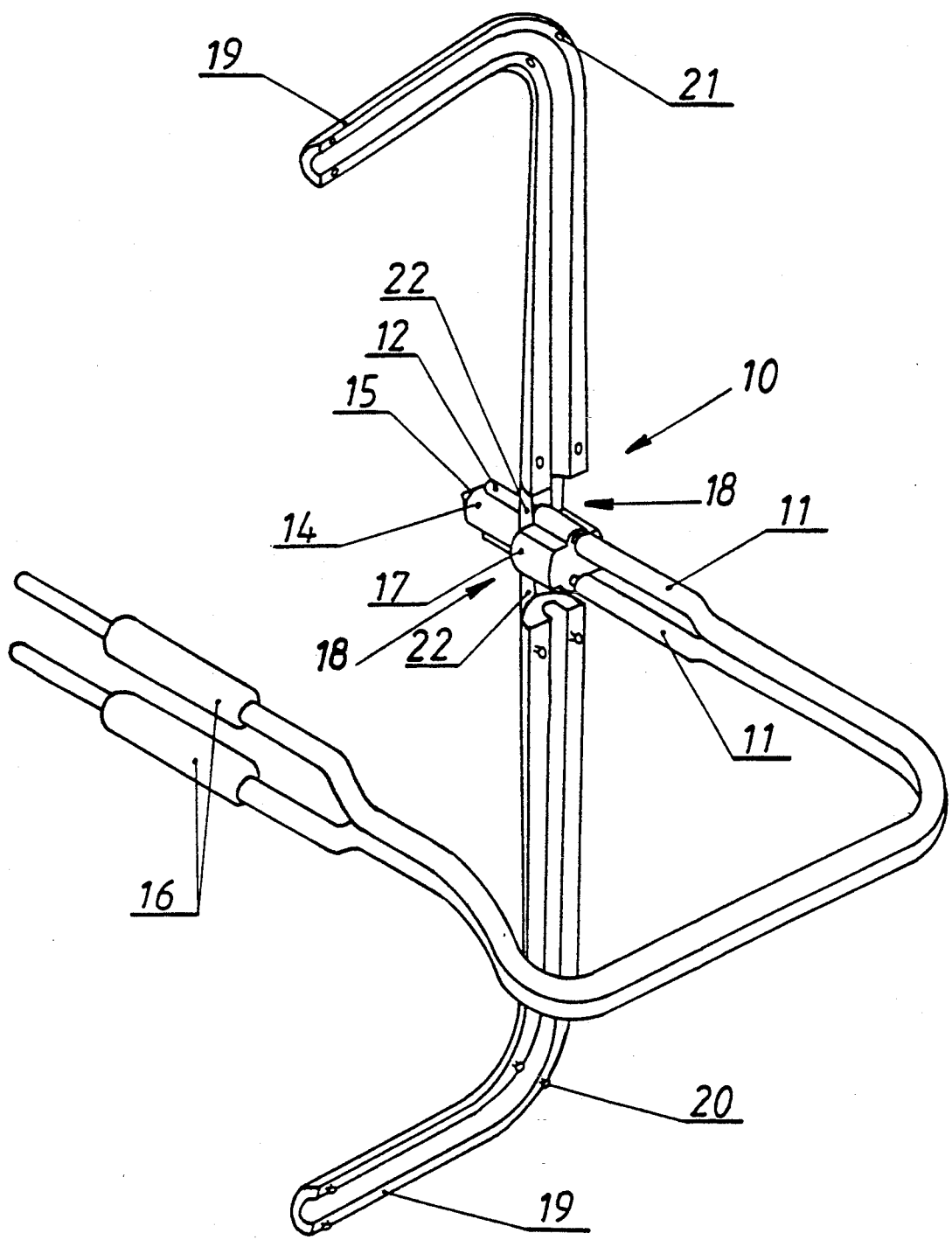
FIG. 4 shows the preform of FIGS. 2 and 3 during manufacture.

The vehicle sun visor mounting shaft shown in FIG. 1 has an L-shape, including a short shaft arm 1 and a long shaft arm 2. The short shaft arm 1 is seated turnably in the mounting hole of a mounting bracket 3 which is adapted to be fastened to the body of the vehicle. The long shaft arm 2 engages a mounting housing, not shown in detail, which is arranged in the sun visor body 4, indicated in dot-dash line. The outer shape of the mounting shaft, which is well known in prior art, includes cylindrical part 5 followed by conical part 6 on the short shaft arm 1. There is a collar 7, followed by a flat 8 and then by a bevel 9 on the long shaft arm 2.

As shown in FIGS. 2 and 3, the mounting shaft includes an inner plastic injection molded part and an outer molded part. The inner plastic injection molded part is developed as a preform 10 which receives two insulated electric wires 11 and two contact pins 12 at the respective ends of the wires. Preferably, the electric wires 11 are in a two wire ribbon cable which is connected electrically at one end to the contact pins 12 by, for instance, a crimp or solder connection. At their other ends away from the bracket 3, the electric wires 11 are provided with plugs 16 which, in turn, are inserted into a plug housing 13 in the vehicle.

The preform 10 has an end part 17 in which the contact pins 12 are supported over a substantial portion of their length by direct extrusion coating. On the end part 17, there is an indented end region 14, which terminates in a conical tip 15. The free end regions of the contact pins 12 are arranged diametrically opposite to each other extending in the axial direction and placed to protrude slightly on the outer circumference of the indented end region 14 which communicates with lighting fixture 30.

As shown in FIG. 4, two shells 19 are formed integral on the end region 14 of the preform 10, in each case via a respective hinge joint 18. Each half shell 19 is formed with an open cavity which receives one electric wire 11. The half shells 19 can be swung together, against each other and can be held fast to each other with the inclusion of the electric connecting wires 11, preferably by means of clip pins 20 on the one shell half which are received in clip recesses 21 on the other clip half. As shown in FIG. 4, the half shells 19 are developed on diametrically opposite sides of the end part 17 and are initially directed perpendicular to the longitudinal axis thereof. FIG. 4 also shows that the hinge connections comprise flexible connecting webs 22. In the swung together condition of the two half shells 19, the ends of the half shell adjacent the end part 17 rest on the end part 17.

After swinging together of the half shells 19, the preform 10 is formed as shown in FIGS. 2 and 3, with the connecting wires 11 and the contact pins 12 incorporated therein.

The preform 10, with the electric wires 11 and the contact pins 12, is supplemented to form a mounting shaft as shown in FIG. 1 by inserting it into a second mold cavity of a plastic injection molding machine (not shown) and then extrusion coating it with plasticized plastic material. The extrusion coating forms a supplementary body 23, shown in dashed line in FIG. 2, which surrounds the preform 10. The end region 14 of the preform 10 extends out of the end of the body 23. The preform extends out of the other end of the body 25 at the end region 24. The end regions 14 and 24 also serve to hold the preform 10 in a correct position in the mold cavity during the extrusion coating.

The manner of operation of the present mounting shaft corresponds essentially to the type known from Federal Republic of Germany Application OS 39 32 808.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A mounting shaft for a vehicle sun visor, the shaft including electrical wiring, the mounting shaft comprising:

the mounting shaft being generally of L-shape, having a first shaft arm rotatably mountable in a mounting bracket in a vehicle, and a second shaft arm connected to the first shaft arm and having a free end for forming a hinge axis for a sun visor body;

the mounting shaft comprising an inner L-shaped preform and a separate outer L-shaped supplementary body which surrounds the inner preform; the free end of the second shaft arm is an end part of the preform;

electric wires having opposed ends supported in the mounting shaft; contact elements located at the ends of the wires, the contact elements being arranged to extend generally in the axial direction of and at the free end of the second shaft arm; the contact elements being incorporated over a part of their length at the end part of the preform;

means for holding the contact elements on the end part; and two half shells formed on the end part of the preform, each half shell including an open cavity for receiving a respective one of the electric wires therein, the half shells being swingable toward each other to enclose the respective electric wires in the half shells.

2. The mounting shaft of claim 1, wherein the inner preform is formed as a plastic injection molded part and the outer supplementary body surrounding the preform is also formed as a plastic injection molded part.

3. The mounting shaft of claim 1, wherein the contact elements are supported on the inner preform to at least slightly protrude from a circumference of the end part of the inner preform which projects beyond an end of the supplemental body.

4. A mounting shaft for a vehicle sun visor, the shaft including electrical wiring, the mounting shaft comprising:

a first shaft arm rotatably mountable in a mounting bracket in a vehicle;

a second shaft arm connected to the first shaft arm and having a free end for forming a hinge axis for a sun visor body, the mounting shaft being generally L-shaped;

an inner L-shaped preform and a separate outer L-shaped supplementary body surrounding the inner preform, the free end of the second shaft arm being an end part of the preform;

electric wires having opposed ends supported in the mounting shaft; contact elements arranged at diametrically opposite positions around the end part of the preform and being arranged to extend generally in the axial direction of the end part at the free end of the second shaft arm, the contact elements being supported over a part of their length at the end of the inner preform to at least slightly protrude from a circumference of the end part of the inner preform which protects beyond an end of the supplemental body, and mans for holding the contact elements on the end part; and two half shells formed on the end part of the preform, each half shell including an open cavity for receiving a respective one of the electric wires therein, the half shells being swingable toward each other to enclose the respective electric wires in the half shells.

5. The mounting shaft of claim 1, wherein the means for holding the contact elements of the wires comprises a coating extrusion.

6. The mounting shaft of claim 1, further comprising means for holding the half shells fast against each other when they are closed together.

7. The mounting shaft of claim 4, wherein the end part has an indented end region, the end region extending from the free end of the second shaft arm; the contact elements are arranged diametrically opposite to each other along a longitudinal axis of the end part to define free ends of the contact pins which protrude from the surface of the end part to be connectable with a lighting fixture.

8. A mounting shaft for a vehicle sun visor, the shaft including electrical wiring, the mounting shaft comprising:

a first shaft arm rotatably mountable in a mounting bracket in a vehicle;

a second shaft arm connected to the first shaft arm and having a free end for forming a hinge axis for a sun visor body, the mounting shaft being generally L-shaped;

an inner L-shaped preform and a separate outer L-shaped supplementary body surrounding the inner preform, the free end of the second shaft arm being an end part of the preform;

electric wires having opposed ends supported in the mounting shaft; contact elements located at the ends of the wires, the contact elements being arranged to extend generally in the axial direction of and at the free end of the second shaft arm, the contact elements being incorporated over a part of their length at the end part of the preform;

means for holding the contact elements on the end part; and two half shells formed on the end part of the preform, each half shell including an open cavity for receiving a respective one of the electric wires therein, wherein the half shells are developed integrally with the end part of the preform and are attached thereto by respective hinge connections so that the half shells are hingedly movable together to enclose the respective electric wires in the half shells.

9. The mounting shaft of claim 8, wherein the half shells are formed on diametrically opposite sides of the end part, each half shell being aligned perpendicular to the longitudinal axis of the end part so that the end part extends from the half shells when the half shells are swung together to include the electric wires.

10. The mounting shaft of claim 9, wherein the hinge connections comprise flexible connecting webs.

11. A mounting shaft for a vehicle sun visor, the shaft including electrical wiring, the mounting shaft comprising;

a first shaft arm rotatably mountable in a mounting bracket in a vehicle;

a second shaft arm connected to the first shaft arm and having a free end for forming a hinge axis for a sun visor body, the mounting shaft being generally L-shaped;

an inner L-shaped preform and a separate outer L-shaped supplementary body surrounding the inner preform, the free end of the second shaft arm being an end part of the preform;

electric wires having opposed ends supported in the mounting shaft;

contact elements located at the ends of the wires, the contact elements being arranged to extend generally in the axial direction of and at the free end of the second shaft arm; the contact elements being incorporated over a part of their length at the end part of the preform;

means for holding the contact elements on the end part;

two half shells formed on the end part of the preform, each half shell including an open cavity for receiving a respective one of the electric wires therein, the half shells being swingable toward each other to enclose the respective electric wires in the half shells; and means for holding the half shells fast against each other when they are closed together, the holding means comprising a clip pin in one of the half shells and a clip receiver in the other half shell which are adapted to cooperate when brought together to fasten the half shells together.

* * * * *